United States Patent
Andrew

(12) 
(10) Patent No.: US 6,550,514 B1
(45) Date of Patent: Apr. 22, 2003

(54) INDEXER SYSTEM FOR USE WITH A PLASTIC PIPE BUTT-FUSION MACHINE

(75) Inventor: Bill D. Andrew, Tulsa, OK (US)

(73) Assignee: Connectra Fusion Technologies, LLC, Gainesville, TX (US)

( * ) Notice: Subject to any disclaimer, the term of this patent is extended or adjusted under 35 U.S.C. 154(b) by 139 days.

(21) Appl. No.: 09/696,815

(22) Filed: Oct. 25, 2000

Related U.S. Application Data

(60) Provisional application No. 60/193,148, filed on Mar. 29, 2000.

(51) Int. Cl.[7] .......................... B32B 31/18; B32B 31/20
(52) U.S. Cl. .................... 156/499; 156/503; 156/535; 156/304.2
(58) Field of Search ................ 156/499, 503, 156/535, 304.2, 304.6, 510

(56) References Cited

U.S. PATENT DOCUMENTS

| | | | |
|---|---|---|---|
| 3,013,925 A | 12/1961 | Larsen | 156/153 |
| 3,552,265 A | 1/1971 | Lucas | 90/21 |
| 3,723,705 A | 3/1973 | Province | 219/243 |
| 3,729,360 A | 4/1973 | McElroy | 156/499 |
| 3,789,493 A | 2/1974 | Province | 29/282 |
| 3,793,119 A | 2/1974 | Province | 156/499 |
| 3,828,413 A | 8/1974 | Province et al. | 29/200 |
| 4,008,118 A | 2/1977 | Wesebaum et al. | 156/499 |
| 4,352,708 A | 10/1982 | McElroy | 156/378 |
| 4,640,732 A | 2/1987 | Stafford | 156/358 |
| 4,957,570 A | 9/1990 | Jenkins et al. | 156/64 |
| 5,013,376 A | 5/1991 | McElroy, II et al. | 156/64 |
| 5,464,496 A | 11/1995 | Wilson et al. | 156/499 |
| 5,527,406 A | 6/1996 | Brath | 156/64 |
| 5,692,285 A * | 12/1997 | Weimer et al. | 29/401.1 |
| 5,725,724 A | 3/1998 | Andrew et al. | 156/535 |
| 5,770,006 A | 6/1998 | Andrew et al. | 156/499 |
| 5,788,790 A | 8/1998 | Andrew | 156/64 |
| 6,212,748 B1 * | 4/2001 | Porter et al. | 29/281.5 |

* cited by examiner

Primary Examiner—Michael W. Ball
Assistant Examiner—Todd J. Kilkenny
(74) Attorney, Agent, or Firm—Gable & Gotwals; Paul H. Johnson

(57) ABSTRACT

An indexer system for a plastic pipe butt-fusion machine of the type having a machine super-structure, parallel horizontal support shafts affixed to the super-structure, a first clamp system for removably grasping an end portion of a first length of plastic pipe, a second clamp system for removably grasping an end portion of a second length of plastic pipe and an actuator system for moving the plastic pipes toward and away from each other, the indexing system having an indexer shaft mounted on the super-structure spaced from and parallel to the support shafts, an indexer carriage slidable on the indexer shaft, a facer and a heater pivotally secured to the indexer carriage, a translation mechanism for laterally positioning the indexer carriage to thereby locate the facer and heater between lengths of plastic pipe and a structural beam secured to the super-structure and parallel to the indexer shaft, the indexer carriage being slidably secured to the structural beam so that it is retained in predetermined orientation relative to the horizontal support shafts.

5 Claims, 7 Drawing Sheets

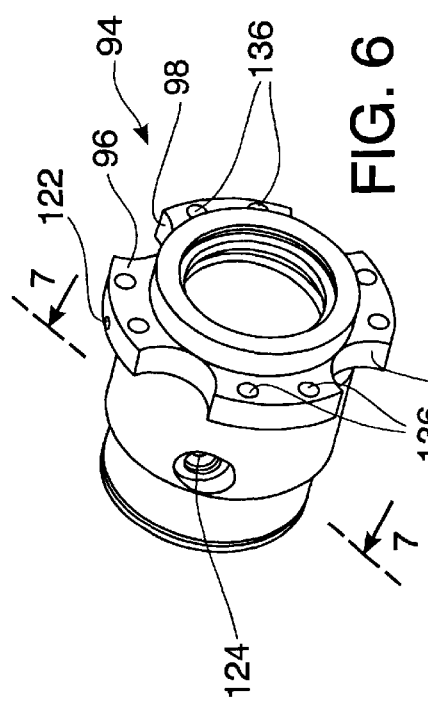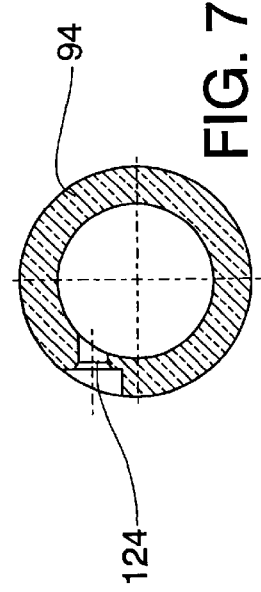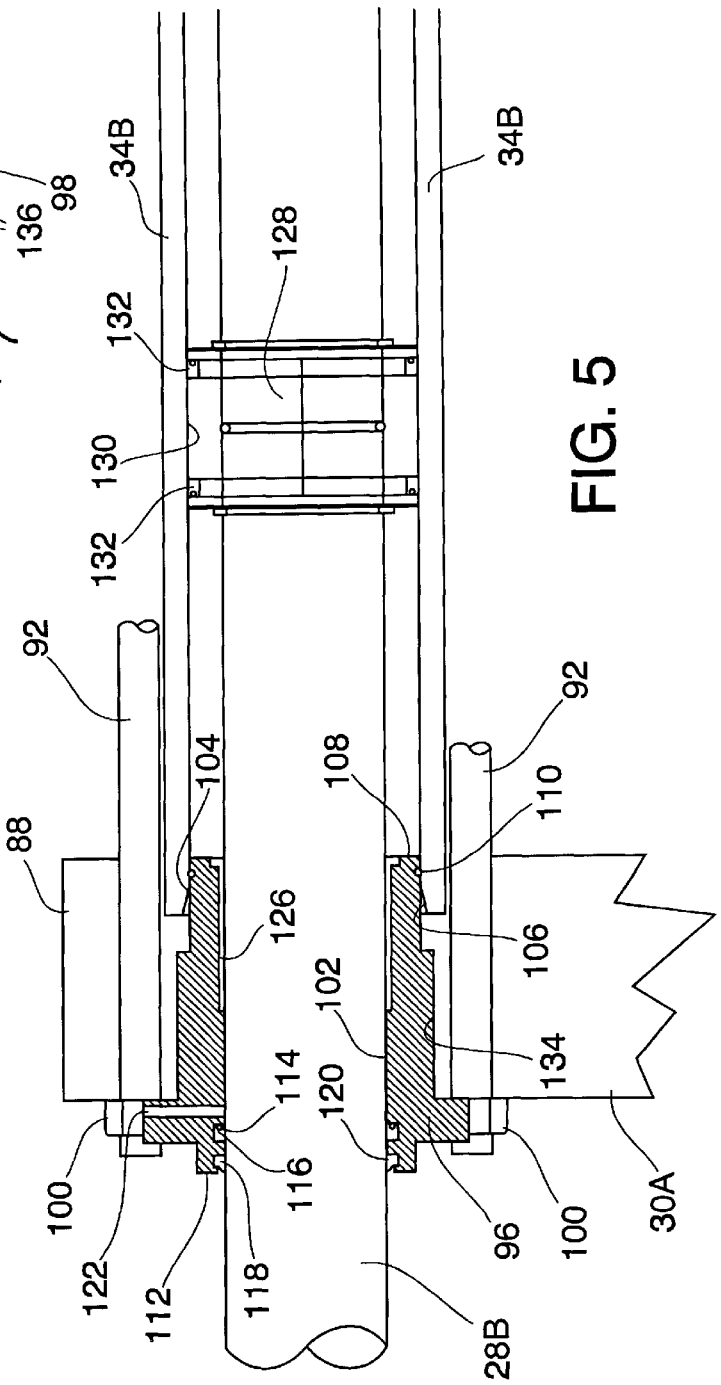

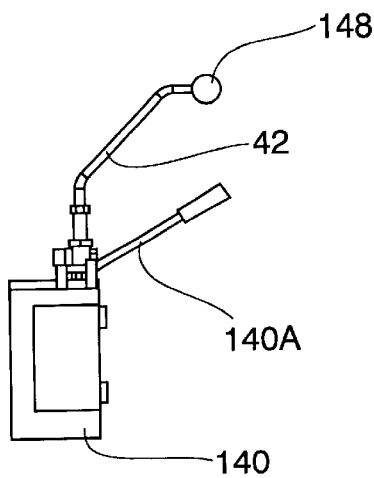
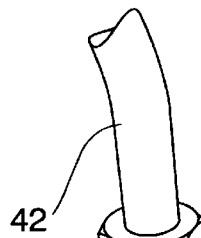
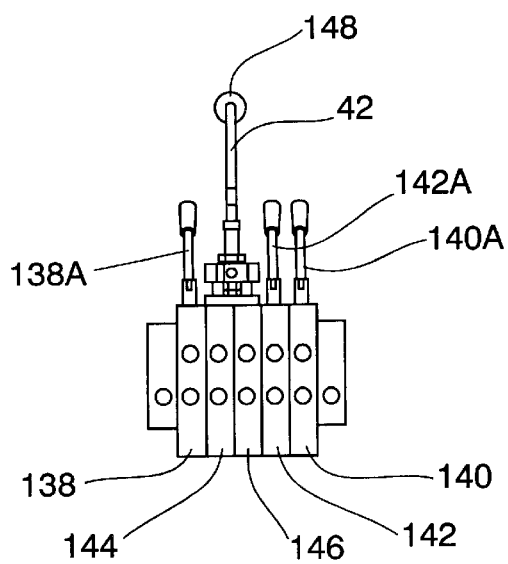
FIG. 10
FIG. 8
Prior Art
FIG. 9

INDEXER SYSTEM FOR USE WITH A PLASTIC PIPE BUTT-FUSION MACHINE

REFERENCE TO PENDING APPLICATIONS

This application is a conversion utility application based on U.S. Provisional Patent Application Ser. No. 60/193,148 for BUTT-FUSION MACHINE filed Mar. 29, 2000.

REFERENCE TO MICROFICHE APPENDIX

This application is not referenced in any Microfiche Appendix.

BACKGROUND OF THE INVENTION

Thermoplastic pipe is a popular type of pipe for use in conveying liquids and gases underground. Much of the gas distribution piping now being installed in the United States and many other countries of the world today for underground burial is formed of thermoplastic pipe. An increasing amount of piping for water and sewages is formed of thermoplastic pipe. Thermoplastic pipe has a great advantage when used for conducting gases and liquids, particularly when buried underground since it is inert and therefore not subject to corrosion or galvanic action in the earth as is most metallic piping.

An additional and important advantage of thermoplastic pipe is that lengths of pipe can be easily and effectively joined end-to-end by thermal fusion. For this reason butt-fusion machines have been developed for supporting and joining lengths of plastic in an axial end-to-end relationship. The ends of the pipe are faced and then heated. While in a molten state the ends of two lengths of pipe are axially advanced to engage each other. The engaged pipe is held in position until the molten ends solidify, effectively joining the pipe. This method of joining thermal plastic pipes end-to-end is commonly referred to as "butt-fusion".

Butt-fusion of thermal plastic pipe is highly effective in that the tensile and bursting pressure strengths of a properly formed joint are usually equal to or greater than the tensile and bursting pressure strengths of the plastic pipe itself. Further, butt-fusion is very economical compared to joining pipe in other ways such as by the use of couplings by which pipe is threaded together or by the use of solvents to weld couplings to plastic pipe. Further, butt-fusion allows pipes of constant diameter to be joined end-to-end without the necessity to enlarge one end of a pipe or reduce the diameter of one end of a pipe to permit it to be joined to an adjacent pipe.

Butt-welding or butt-fusion of plastic pipe is typically carried out employing a machine that has facilities for grasping end portions of first and second lengths of plastic pipe in clamps. After the opposed end portions of two lengths of plastic pipe are grasped by clamps, it is a common procedure to then prepare the end faces of the pipes to be joined so that the ends are each in a plane that is perpendicular the axis of the pipe and therefore so that the ends are parallel to each other. For this purpose, a facer is employed. A facer is a rotatable device having a cutting face on each opposite side. After the pipes are grasp by clamps, the facer is interposed between the opposed ends of the pipes and the pipes are moved one toward the other. In the typical butt-fusion machine, one of the clamped end portions of a length of the pipe is held stationary while the other end portion is moved toward the stationary end. Rather than holding one pipe stationary and moving the opposed adjacent pipe, the system can be operated in which both clamp systems are movable toward each other. Whether one pipe or both pipes are moved the only important action is that the ends to be joined are movable with respect to each other. With a facing machine positioned between opposed ends, the pipes are moved so that the opposed ends of the pipes to be joined simultaneously engage rotating cutters. The cutters shave both opposed ends of the pipes simultaneously to shape the opposed ends so they are in parallel planes and free of voids or irregularities.

After the opposed ends of the pipes have been shaped, the pipes are moved apart from each other to allow the cutter head to be withdrawn.

Next, a heater platen is interposed between the opposed ends of the pipe. A heater platen is a device to heat the ends of the pipes to a temperature in the range of about 375° F.–500° F. The opposed ends of the pipes are held in contact with the heated platen until the opposed end surfaces reach a molten state. Thereafter the pipes are withdrawn away from each other to allow the heater platen to be removed. The pipes are then immediately moved toward each other without any intervening apparatus so that the molten ends of the pipes abut each other. The pipes are advanced toward each other so that the molten thermoplastic at the ends form an internal and external circumferential bead as the plastic flows as the pipes are forced against each other. The pipes are held in this position a sufficient length of time to allow the molten ends to cool to a temperature that is below the molten state—that is, to cool to a temperature at which the plastic joining the pipes is solid. The pipes are then welded to each other or "butt-fused" to each other.

The clamps holding the opposed end portions of adjacent length of the pipe can then be removed and the butt-fusion machine then relocated to repeat the procedure as required to initiate a new butt-fusion procedure. By sequentially butt-fusing lengths of pipe, a total integral pipeline of any preselected length can be provided.

For background information relating to butt-fusion of thermoplastic pipe, reference may be had to the following previously issued United States patents:

| PAT. NO. | INVENTOR | TITLE |
| --- | --- | --- |
| 3,013,925 | Larsen | Method and Means for Welding Thermoplastic Pipes |
| 3,552,265 | Lucas | Method and Apparatus for Facing Thermoplastic Pipe |
| 3,723,705 | Province | Fusion Heater |
| 3,729,360 | McElroy | Portable Thermoplastic Pipe Fusion Apparatus |
| 3,789,493 | Province | Hydraulic Actuated Fusion Unit for Plastic Pipe |
| 3,793,119 | Province | Facing Tool for Plastic Pipe Fusion Apparatus |
| 3,828,413 | Province et al. | Pipe Alignment Device |
| 4,008,118 | Wesebaum et al. | Butt Fusion Machine |
| 4,352,708 | McElroy | Defined Force Fusion Machine for Joining Plastic Pipe |
| 4,640,732 | Stafford | Apparatus for Fusion Joining of Thermoplastic Pipes |
| 4,957,570 | Jenkins et al. | Butt-Welding of Pipes |
| 5,013,376 | McElroy, II et al. | Programmable Computer Controlled Pipe Fusion Device |
| 5,464,496 | Wilson et al. | Plastic Pipe Butt Fusion Machine |
| 5,527,406 | Brath | Method, A Heating Device and an Apparatus for Fusing Separate Thermoplastic Bodies |

| PAT. NO. | INVENTOR | TITLE |
| --- | --- | --- |
| 5,725,724 | Andrew et al. | Plastic Pipe Facer for Butt Fusion Application |
| 5,770,006 | Andrew et al. | Butt Fusion Machine for Manufacturing Full Size Segmented Pipe Turns |
| 5,788,790 | Andrew | Method for Butt Welding Thermoplastic Pipe Including Automatic Drag Compensation |

BRIEF SUMMARY OF THE INVENTION

An improved butt-fusion machine for joining end to end relationship thermal plastic pipes includes an improved indexing system, an improved gland for closing the end of a cylinder piston, a mechanism for simultaneously controlling the position of two valves to thereby allow an operator of a butt-fusion machine to more effectively heat the ends of opposed lengths of plastic pipe and to move the ends while in heated state, in juxtaposed position for fusing the pipe and a circuit for detecting the failure of heating elements in a heating element powered by three phase power source.

The system for effectively joining the opposed ends of two lengths of plastic pipe includes a super-structure for manipulating lengths of the plastic pipe. The super-structure frequently includes a frame having wheels affixed thereto so that the frame and the supporting super-structure can be moved about as required for adjoining lengths of plastic pipe. The super-structure supports a first support shaft and a spaced apart horizontal parallel second support shaft. A first clamp system is supported on the opposed shafts, the first clamp system being arranged to removably grasp an end portion of a first length of plastic pipe. A second clamp system is supported on the support shafts for removably grasping the end portion of a second length of plastic pipe. An actuator system, usually a hydraulic cylinder piston is employed for moving the clamp systems with respect to each other. In a typical arrangement, the first clamp system is maintained stationary on the support shafts while the second clamp system is moved laterally on the support shafts with respect to the first clamp system so that the length of plastic pipe grasped by the second clamp system can be moved toward and away from the first clamp system. However, it can be seen that the butt-fusion machine can be arranged so that both the first and the second clamp systems are movable towards and away from each other.

In order to fuse two lengths of thermal plastic pipe grasped by these support systems that are carried on the opposed support shafts it is necessary to trim the opposed ends of the lengths of plastic pipe so that they are in a common plane, preferably a plane that is perpendicular to the longitudinal axis of the lengths of plastic pipe. This is accomplished by positioning between the opposed lengths of plastic pipe a facer having cutting edges on opposed surfaces. With the facer positioned between the lengths of plastic pipe, the plastic pipes can be moved toward each other to firmly engage the facer. The facer, when energized, rotates to simultaneously shape the opposed ends of the plastic pipes so they will substantially match each other.

After the facing operation is complete, the plastic pipes must be axially separated from each other by moving one of the clamping systems with respect to the other. Once the pipes have been moved apart, the facer system can be withdrawn. To fuse the pipes, the ends of the opposed lengths of pipes must be simultaneously heated so that the opposed ends are concurrently at a molten state. For this purpose, a heater platen is positioned between the opposed lengths of plastic pipe and the lengths of pipe are then moved toward each other to simultaneously engage opposed heated surfaces of the platen. After the ends of the pipes have simultaneously been heated to the molten state, the pipes must be withdrawn away from each other to permit the heater platen to be removed. After the platen is removed, the pipes are moved toward each other in axial alignment to abut their fused end surfaces. The abutted heated end surfaces are held in contacted position for a sufficient length of time to allow the heated surfaces to cool, to a temperature below the molten state, thereby effectively thermally fusing the lengths of pipe to each other.

A properly performed butt-fusion results in the pipes being joined in such a way that the pipes are stronger at the point of fusion than at all unfused portions of the length of the pipes.

The structure that is used to laterally position a facer and a heater platen between opposed ends of plastic pipe and to permit the facer and heater platen to be separately rotated into actuating position and rotated out of actuating position is referred to as "an index carriage". An improved system for supporting an index carriage to a butt-fusion machine super-structure that includes a first and second parallel horizontal support shaft makes use of an index shaft that is mounted on the super-structure and spaced from and parallel to the support shafts. An index carriage is slidable on the index shaft. A facer and a heater are separately and pivotally secured to the index carriage. The translation mechanism, which preferably is a piston/cylinder extends from the super-structure to the index carriage to thereby selectively longitudinally locate the index carriage and thereby the facer and heater between the opposed ends of lengths of plastic pipe. A structural beam is secured to the super-structure and parallel to and spaced from the index shaft. The index carriage is slidably secured to the structural beam so that the index carriage is retained in predetermined orientation relative to the horizontal support shafts.

In a preferred arrangement a linear bearing system is mounted on the index shaft to support the index carriage and in a further preferred arrangement the index shaft is designed to support substantially the entire weight of the index carriage including the facer and heater that is supported thereto so that the structural beam functions substantially exclusively to maintain the vertical orientation of the index carriage and specifically the vertical orientation of the facer and heater.

Well designed butt-fusion machines for plastic pipe, including machines for butt-fusion have relatively larger diameter plastic pipes that require the use of cylinder/piston devices—that is, devices that utilize hydraulic fluid power to attain mechanical force and for moving portions of the butt-fusion machine relative to the machine super-structure. A problem with cylinder pistons is the structure that is used for closing the end of a tubular cylinder having a cylindrical shaft extending from it. The disclosure herein provides the improved structure in the form of a tubular gland having an inner end and an outer end and having an internal shaft receiving opening therethrough, the opening being defined by concentric increased internal diameter portions adjacent the gland inner end and a radially extending fluid port communicating with the increased internal diameter tubular portion. A reduced external diameter at the inner end facilitates receiving the internal tubular surface of a cylinder tube.

Adjacent the outer end of the gland is an integral enlarged externally dimensioned flange portion having bolt receiving openings therein that facilitate securing the improved gland structure to the tubular cylinder.

As has been previously stated, butt-fusing opposed ends of plastic pipe by use of a butt-fusion machine requires an operator that has manual dexterity sufficient to control the mechanism such that the lengths of pipe can be moved toward and away from each other and coordinated with the movement of an index mechanism allowing a facer to be inserted and removed, allowing a heater to be inserted and removed and allowing opposed lengths of pipe having ends that have been raised to fusion temperature to be forced into contact with each other and maintained in contact for the time required for fusion to take place. This system requires the manipulation of at least three valves to control the hydraulic action necessary to accomplish a butt-fusion. Since an operator has available only his two hands to control these three valves, the dexterity and coordination of an operator is challenged in order to successfully achieve butt-fusion. To simplify the manual requirements of an operator a mechanism is provided for simultaneously manually controlling two valves by the use of one hand. This mechanism employs valve spools that are vertically positioned adjacent to each other and includes a manually controllable pivot member—that is, pivotal for left and right. A first lug extends laterally from the pivot member and a first horizontal direction and a second lug extends laterally from the pivot member in a second horizontal direction, the second lug being rotatably spaced 90° from the first lug. A first positioning member is affixed to the first valve spool and has a horizontally extending opening receiving the first lug, a second positioning member is affixed to the second spool and has an opening receiving the second lug. At least one of the openings in a positioning member is preferably elongated allowing a lug to move laterally in the positioning member without vertically changing the positioning member so that the lug can move laterally without either opening or closing the valve to which the positioning member is attached. The single mechanism thereby which preferably has an elongated handle affixed to the pivot member allows an operator the use of one hand to control two valves to either open or close each of them separately or to open and/or close both valves simultaneously, all with one hand.

An important piece of equipment necessary for achieving highest quality butt-fusion of plastic pipes is the heater, sometimes referred to as a heater platen. A heater is employed in butt-fusing plastic pipe is a plate having opposed surfaces, the plate being typically circular and having embedded in the plate electric resistance heating elements. Electrical energy is supplied to the heating elements to raise the opposed surfaces of the heater platen to a temperature that will relatively quickly raise the opposed ends of plastic pipes to molten temperature. While the energy requirements for fusing the ends of small diameter plastic pipes is not great, fusing large diameter plastic pipes such as twelve inches or greater requires substantial electrical energy, particularly where the objective is to quickly heat the ends of the plastic pipe so as to speed up the butt-fusion process. For this reason, it is a common practice in the industry to power the heater platens for butt-fusion machines for larger diameter pipe with three phase energy. That is, the heater elements embedded within the heater are connected to receive three phase energy meaning that typically the heater elements are connected in either a wye or delta configuration. If a heater element fed by a three phase power source fails—that is, burns out or develops an open circuit, the electrical energy supplied to the other two phases of the three phase circuitry can continue to heat a portion of the heater elements within a platen. This results in uneven heating of the platen that can result in defective butt-fusion. The system herein provides a circuit for detecting the failure of a heating element in a three phase wye or delta arrangement fed by three phase power source by employing current transformers that measure the current flow through each of the three conductors extending from the three phase power source. A current imbalance sensor is connected to the three current transformers to provide a circuit change when unbalance is detected between the level of current sensed by the three current transformers. An indicator, preferably an indicator light or sound generator such as a horn, is actuated by the current imbalance sensor to provide a warning to an operator that a fault has occurred in the heaters employed in a heater platen.

A better and more complete understanding of the invention will be obtained from the attached drawings and from the detailed description of the preferred embodiments.

BRIEF DESCRIPTION OF THE DRAWINGS

FIG. 2 illustrates the most commonly employed present system for supporting the heater and facer components of a butt-fusion machine and therefore FIG. 2 is representative of the prior art.

FIG. 5 is a fragmentary view of a portion of the butt-fusion machine of FIG. 1 showing a cylinder and piston combination as employed for translating clamps used to hold one length of plastic pipe toward and away from clamps that hold an adjacent stationary length of plastic pipe. Specifically, FIG. 5 is a cross-sectional view of an improved gland by which an end of a cylinder slidably receives a shaft having a piston mounted thereon.

FIG. 6 is an isometric view of the gland employed in FIG. 5 to form one end of a cylinder that receives a shaft.

FIG. 7 is a cross-sectional view of the gland shown in FIGS. 5 and 6, the cross-section being taken along the line 7—7 of FIG. 6.

FIG. 8 is a fragmentary isometric view of a commercially available mechanism for the control of two three-position hydraulic spool valves. By making use of these mechanisms an operator can manipulate by one hand, separate functions of the butt-fusion machine of FIG. 1.

FIG. 9 is a reduced scale elevational view of a system that employs the mechanism of FIG. 8.

FIG. 10 is a side view of the hydraulic valve system of FIG. 9.

DETAILED DESCRIPTION OF THE PREFERRED EMBODIMENTS

Figure 1:
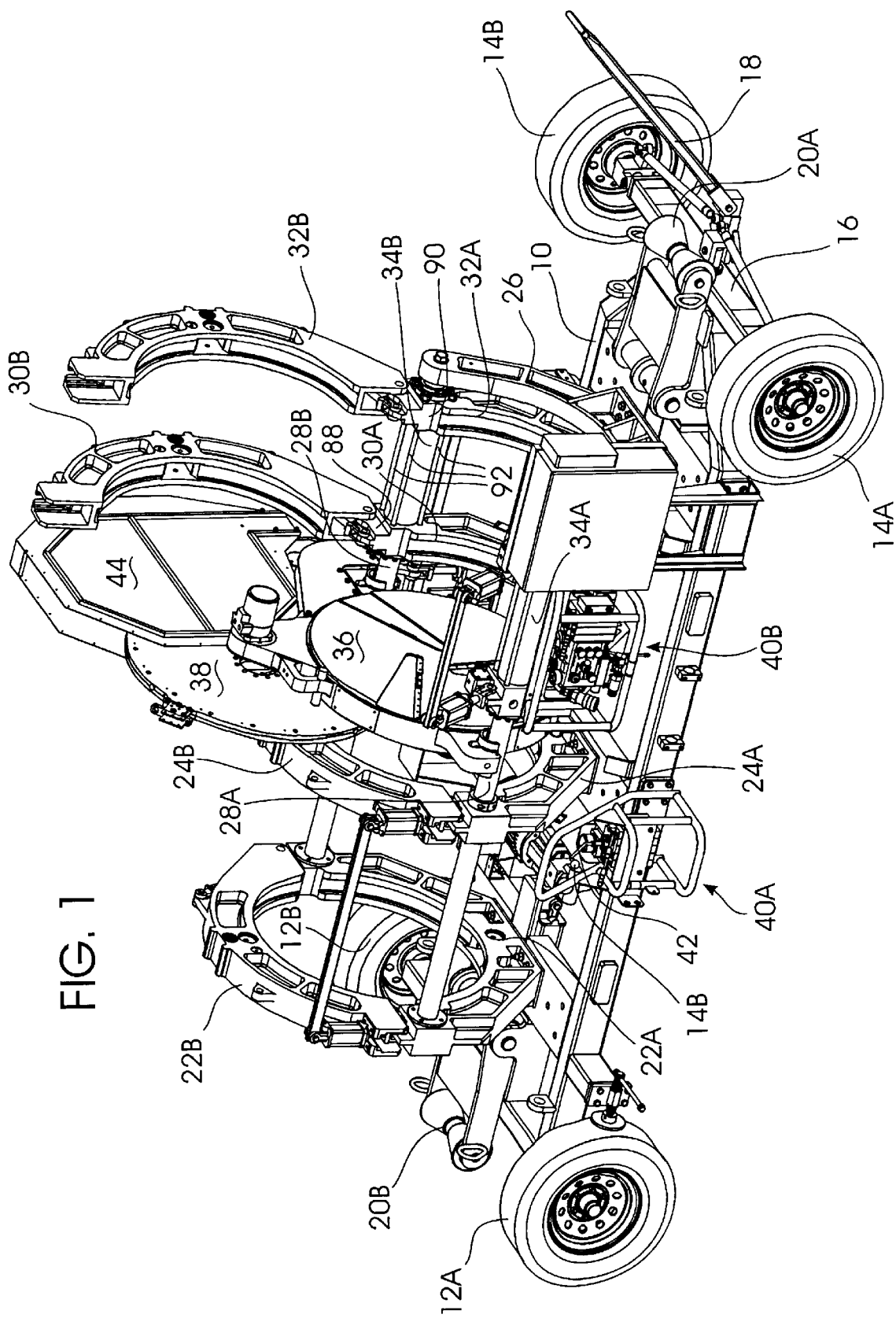
FIG. 1 is an isometric view of a machine for butt-fusion of thermal plastic pipe that incorporates the principles of this invention. The machine, as illustrated, is mounted on a super-structure that is provided with wheels, the front set of wheels being steerable so that the butt-fusion machine can be easily moved on the earth's surface from one location to another.

Referring first to FIG. 1, the basic components making up an improved butt-fusion machine that employs the principles of this invention are illustrated. The butt-fusion machine illustrated in FIG. 1 is mounted on the super-structure 10 of a trailer having opposed rear wheels 12A and 12B and opposed front wheels 14A and 14B. The front wheels are pivotally mounted on a front axle 16, the front wheels being pivoted in accordance with the direction of a tongue 18 by which the super-structure can be moved about over the earth's surface. Elevationally positionable rollers 20A and 20B are used to support and guide end portions (not shown) of lengths of thermoplastic pipe.

The components of FIG. 1 described to this point are not directly related to the invention but establish the environment in which the improved butt-fusion machine of this invention can typically be mounted. It is understood that the invention herein is not limited to a butt-fusion machine that is moved about in any particular arrangement as the machine could easily be made without wheels to be hoisted by a winch and moved from one location to another.

Supported to super-structure 10 is a first fixed clamp bottom portion 22A that has a pivotal clamp top portion 22B. In like manner, a second fixed pipe clamp bottom portion 24A is supported to the frame super-structure which supports a second fixed clamp pivotal portion 24B. Fixed clamp bottom portions 22A and 24B remain in a stationary position with respect to the super-structure 10 and the pivotal upper portions 22A and 24B are raised to receive a pipe therein and then lowered into position and clamped to securely hold the end portion of one length of plastic pipe that is to be butt-fused.

Mounted on super-structure 10 adjacent the front end thereof is a yoke 26. Extending between yoke 26 and the fixed clamp bottom portions 24A are opposed paralleled shafts 28A and 28B. In this manner, shafts 28A and 28B are securely structurally supported above super-structure 10 and the shafts are in a generally horizontal plane and are rigidly secured parallel to each other within the horizontal plane.

Slidably received on shafts 28A and 28B are the opposed ends of a first moveable clamp bottom portion 30A. Also slidably secured on shafts 28A and 28B are the opposed ends of a second movable clamp bottom portion 32A. Pivotally secured to first movable clamp bottom portion 30A is a first movable clamp top portion 30B and in like manner, pivotally secured to second movable clamp bottom portion 32A is a second movable clamp top portion 32B. The function of the pair of movable clamps consisting of bottom portions 30A and 32A and pivoted top portions 30B and 32B is to grasp the end portion of a length of thermoplastic pipe. When opposed lengths of thermal plastic pipe (not seen in FIG. 1) are securely grasped by the fixed clamps and the movable clamps, the opposed ends of the lengths of plastic pipe can be moved toward and away from each other in the sequence employed in butt-fusion.

Received on first shaft 28A is a cylinder 34A, a rearward end of cylinder 34A being secured to one end portion of first movable clamp bottom portion 30A. The opposite end of cylinder 34A is secured to one end portion of the second movable clamp bottom portion 32A, the interconnection of these components being obscured in FIG. 1.

Received on second shaft 28B is a second cylinder 34B having one end secured to an end portion of the first movable clamp bottom portion 30A. The opposite end of second cylinder 34B is secured to an end second moveable clamp bottom portion 32A. Contained within cylinders 34A and 34B are pistons that will be described subsequently. By the use of hydraulic fluid pressure, the movable clamps having a length of pipe therein can be moved toward and away from pipe held by the fixed clamps.

Shown positioned between the set of fixed clamps and the set of movable clamps is a facer 36 that is used to shape the opposed end surfaces of adjacent lengths of plastic pipe to insure that the end surfaces are clean and are in planes parallel to each other and in planes that are perpendicular to the longitudinal axes of the lengths of plastic pipe to be joined. Facer 36 is shown in the position wherein it is used to shape the lengths of plastic pipe which is accomplished by moving the length of plastic pipe supported by the movable clamps toward the length of pipe supported by the fixed clamps. After shaping, the moveable length of pipe is moved away from the fixed length of pipe and facer 36 is then pivoted out of the way.

Shown partially extending between the fixed clamps and movable clamps is a heater 38 that is employed to heat opposed ends of lengths of pipe to be fused. After a molten temperature has been achieved, heater 38 is pivoted into its home position to allow pipes to be fused to be moved into abutted relationship.

Many of the steps required to butt-fuse plastic pipe of smaller diameters can be carried out manually. That is, pipes can be moved toward and away from each other manually, the facer and heater can be indexed into proper longitudinal position manually and the facer and heater can be moved in to and out of operating position manually. When larger pipes are butt-fused, many of these operations exceed normal manual strength and accordingly the operations are carried out hydraulically in which the operator, by use of valves, controls cylinder/piston devices to move the components as necessary. For this purpose, a hydraulic control system generally indicated by the numerals 40A and 40B is provided. Control system 40A is supported on super-structure 10. Hydraulic control system portion 40B is supported by first movable clamp bottom portion 30A and second movable clamp bottom portion 32A. A portion of the hydraulic control system, which will be described later in detail, employs a handle or joystick 42 to enable an operator to more expeditiously change the position of hydraulic valves to cause the components of the butt-fusion machine to behave as required for a successful butt-fusion operation.

As a safety feature and to conserve energy, a common practice is to store heater 38 when in its rest position in a shroud 44. The shroud does not pivot forward with the heater 38 but is translated longitudinally with the heater so that when the heater is not in position between adjacent lengths of plastic pipe, it can rest within shroud 44.

Figure 2:
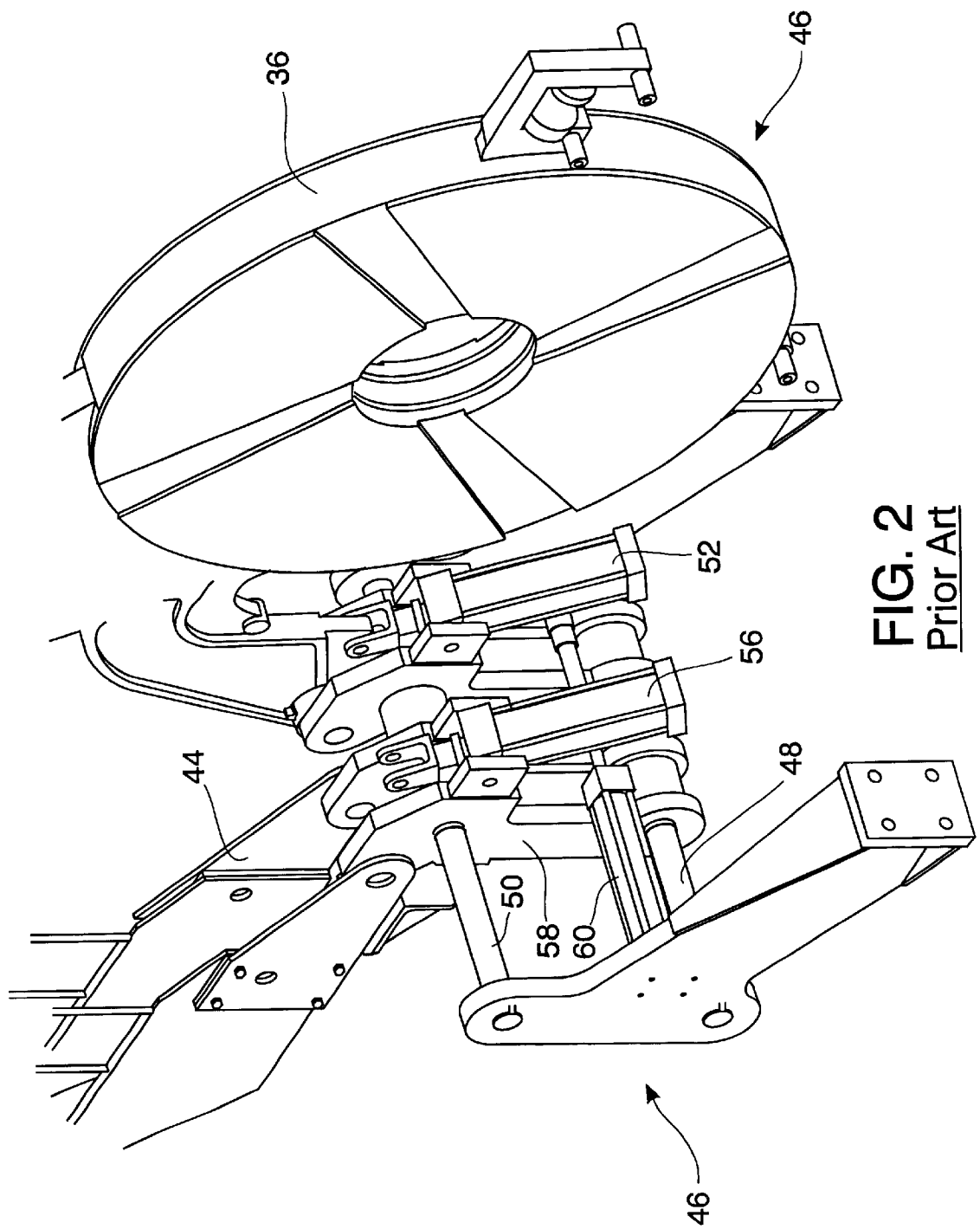
FIG. 2 is an isometric view showing an indexing mechanism as used on a butt-fusion machine by which a facer and a heater can be positioned between adjacent lengths of plastic pipe.
Figure 3:
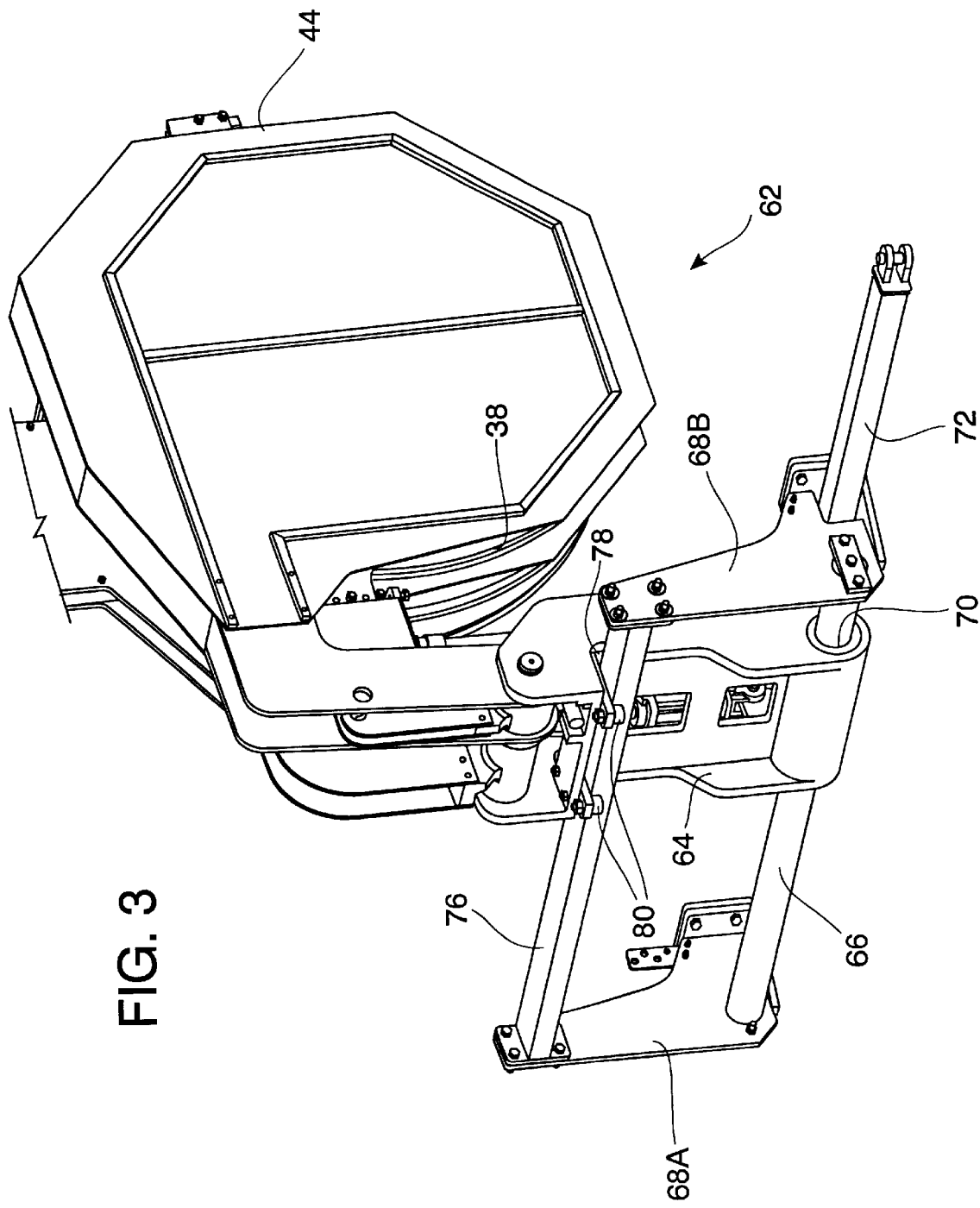
FIG. 3 is an isometric view of an improved indexing mechanism for supporting a heater and facer in a butt-fusion machine.
Figure 4:
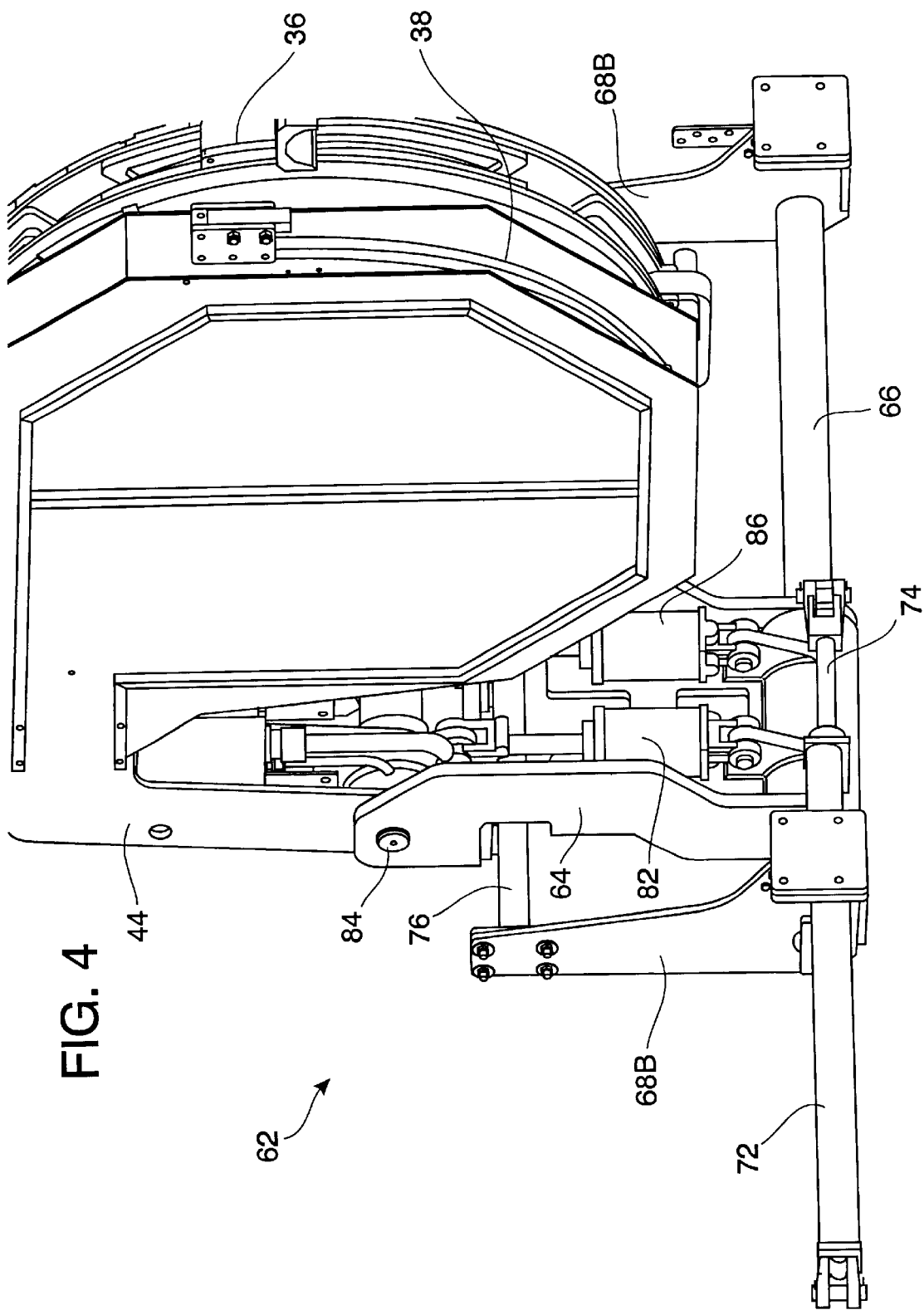
FIG. 4 is another isometric view of the improved indexing mechanism of FIG. 3 taken from a different perspective.

An important feature of the butt-fusion machine of this invention is an improved indexing mechanism illustrated in FIGS. 3 and 4 taken in conjunction with FIG. 2. FIG. 2 is illustrative of a type of indexing mechanisms in current use and therefore FIG. 2 is representative of the prior art and provides background information to enable a fuller understanding of the improved indexing machine that is illustrated in FIGS. 3 and 4.

As has been previously described, in the process of butt-fusing adjacent lengths of plastic pipe, a facer is first used to trim and square the ends of both lengths of pipe. Then the facer is moved out of the way and a heater is brought between the pipe ends. Once the pipe ends are properly heated, the heater is moved from between the pipes. They are then pushed together and held until the joint has cooled. The mechanism which moves the facer 36 and the heater 38 (as seen in FIG. 1) into position is called an "indexer". FIG. 2 shows an indexer mechanism of the kind presently employed in the typical butt-fusion machine. The indexer mechanism of the prior art indicated generally by the numeral 46 not only translates the facer and heater into lateral positions between lengths of plastic pipe but also lifts facer 36 and heater 38 in to and out of operating positions. The typical indexer mechanism as shown in FIG. 2 includes spaced apart paralleled shafts 48 and 50. A facer lift cylinder 52 and a heater lift cylinder 56 are secured to an indexer carriage 58. The use of two shafts 48 and 50 provides a means to prevent the rotation of index carriage 58.

A hydraulic cylinder 60 that has a shaft extending from it is employed to laterally translate indexer carriage 58 so the facer and heater can be properly laterally positioned between opposed ends of plastic pipe.

Shafts 48 and 50 must stay parallel to each other for proper operation of indexer mechanism 46. This necessitates the use of precision machining which is expensive. In addition, shafts 48 and 50 are subject to damage in the field and the two shafts 48 and 50 can be easily knocked out of alignment with each other.

An improved indexer is generally indicated by the numeral 62 in FIGS. 3 and 4. Indexer 62 has a carriage 64 that supports a facer 36 and a heater 38, the heater and facer being of the type previously described.

The improved indexer 62 of FIGS. 3 and 4 employs a single support shaft 66 supported at opposed ends by brackets 68A and 68B that are secured to super-structure 10 of FIG. 1. The improved indexer of this invention is not seen in FIG. 1 since it is on the opposite side of the illustration, however indexer 62 functions to support and laterally translate facer 36, heater 38 and heater shroud 44 to the proper lateral position as required in the use of the butt-fusion machine of FIG. 1.

As seen in FIGS. 3 and 4, improved indexer 62 uses only a single shaft 66 supported by brackets 68A and 68B. A linear bearing 70 permits index carriage 64 to be moved laterally on shaft 66. To laterally position index carriage 64, an index cylinder 72 is employed, the cylinder having a piston rod 74 extending from it, the outer end of the piston rod being attached to index carriage 64.

Horizontally extending between upper end portions of bracket 68A and 68B is a beam 76. An inner pair of rollers 78 (only one of which is seen in FIG. 3) is secured to index carriage 64. The inner rollers engage one vertical side surface of beam 76. A pair of outer rollers 80 (seen in FIG. 3) engage the opposite vertical side of beam 76. The interrelationship between rollers 78 and 80 and beam 76 allows index carriage 64 to be moved laterally but at the same time remain in an upright plane.

In order to move heater 38 in to and out of operating position, a heater lift cylinder 82 (as best seen in FIG. 4) is employed. Heater 38 pivots about a pin 84. In like manner, facer 36 is pivoted in to and out of operating position by a facer lift cylinder 86, the facer also pivoting about pin 84, or more precisely, about an axis coincident with pin 84. Thus by controllably supplying hydraulic energy to lift cylinders 82 and 86, facer 36 and heater 38 can each be moved in to and out of operating position as necessary to practice the sequence of steps to achieve a butt-fusion.

The improved indexer 62 uses a single support shaft 66 that carries linear bearing 70 by which indexer carriage 64 is supported and by which the weights of facer 36 and heater 38 are supported. Separate beam 76 is used to resist the rotation of carriage 64. The pairs of rollers 78 and 80 are mounted on indexer carriage 64 and bear against the vertical sides of beam 76. By the use of only a single shaft 66 the expense of manufacturing the indexer of 62 is reduced compared to that of the prior art (as illustrated in FIG. 2) that requires two separate shafts. Further, the improved indexer 62 is less sensitive to damage since beam 76 serves only to resist the rotation of carriage 64. By placing support shaft 66 near the bottom of the butt-fusion machine super-structure, all the weight of the heater and facer can be carried by it and the indexing hydraulic cylinder 72 can be positioned near the linear bearing 70 to prevent sticking problems.

In summary, a salient feature of improved indexer 62 is the use of a single cylindrical shaft 66 to carry the weight of a facer and heater and a separate beam 76 to prevent rotation.

The system by which the lower portion of the first and second movable clamps 30A and 32A are moved on support shafts 28A and 28B, shaft 28B being illustrated in FIG. 5. This figure shows the left hand portion of second cylinder 34B. At the upper end portion of first moveable clamp bottom portion 30A is a housing 88 to which first moveable clamp 301 is pivotally attached. As seen in FIG. 1, at the opposite end of cylinder 34B is a housing 90 that is the upper end portion of second moveable clamp bottom portion 32A and that receives the pivotal attachment of second moveable clamp of top portion 32B. Thus second cylinder 34B is captured between housings 88 and 90 (as seen in FIG. 1) however, in FIG. 5 only the left hand housing 88 is shown. Second cylinder 34B is held in position by rods 92 extending between housings 88 and 90. To sealably close the ends of cylinder 34B there is, in each housing 88 and 90, an improved gland 94. The improved gland is shown in cross-section in FIG. 5 and in isometric view in FIG. 6. The gland is a tubular member having an integral flange portion 96 having notches 98 therein. The notches serving to receive rods 92 and nuts 100 (as seen in FIG. 5).

Gland 94 has an internal passageway 102 therethrough that sealably and slidably receives shaft 28B. Further, gland 94 has a reduced external diameter cylinder surface 104 that sealably receives one end of cylinder 34B. To guide the inner end portion of gland 94 into cylinder 34B, the internal cylindrical surface of the cylinder is beveled at 106. Gland 94 has, adjacent its inner end 108, an external circumferential groove that receives a circumferential O-ring seal 110, the seal serving to provide leak proof engagement with the internal surface of cylinder 34B.

Formed within the gland internal cylindrical passageway 102 adjacent the gland outer end 112 is a first circumferential groove 114 that receives an O-ring 116 to thereby seal the external surface of shaft 28B. Spaced from groove 114 is a second groove 118 that receives a rod wiper 120.

Extending radially within the flange portion 96 of gland 94 is a bleed port 122.

In order to provide hydraulic fluid communication to the interior of cylinder 34B, gland 94 is provided with a hydraulic fluid port 124 as seen in FIGS. 6 and 7. Fluid port 124 is internally threaded so as to receive one end of a hydraulic hose by which hydraulic fluid can flow to and from cylinder 34B. As seen in FIG. 5, the internal passageway 102 formed in gland 94 has, in the area toward inner end 108 an enlarged internal diameter portion 126. Fluid port 124 communicates with enlarged internal diameter portion 126 to permit passage of hydraulic fluid from the port into the interior of cylinder 34B.

Secured to shaft 28B is a piston 128 having an external cylindrical surface that slidably and sealably engages internal cylindrical surface 130 of cylinder 34B. Piston 128 is preferably formed as a tubular member slidably positioned on and secured to shaft 28B, further, piston 128 preferably includes seals 132 so that the piston is slidably but sealably received within the interior of cylinder 34B.

To cause movement of the movable clamps consisting of first movable clamp lower portion 30A and top portion 30B and second moveable clamp lower portion 32A and top portion 32B, hydraulic fluid is supplied to one end or the other of cylinder 34B As fluid is supplied to one end of cylinder 34B through a gland port 124 fluid is extracted from the other end thereby causing the cylinder to move with respect to piston 128. Thus piston 128 and shaft 28B function in a manner that is opposite that of a typical cylinder/piston system. In the present arrangement, piston 128 remains stationary with respect to super-structure 10 of the butt-fusion machine whereas cylinder 34B translates with respect to piston 128 in response to hydraulic fluid pressure to thereby move the movable clamps. The one piece hydraulic cylinder gland 94 (as illustrated in FIGS. 5, 6 and 7) is a significant improvement over the sealing systems for cylinders traveling on piston of prior butt-fusion machine designs. A particular advantage of the one piece gland 94 described herein is that it affords an easy means of replacing rod wiper 120, O-ring seal 116 and piston seals 132 without completely disassembling the clamp assembly. That is, gland 94 is slidably received within an opening 134 that is provided in housing 88 and is held in position in the housing by means of bolts (not seen) the bolts extending through openings 136 in the flange portion 96 of the gland. The bolt openings 136 are seen in FIG. 6. By removing such bolts gland 94 can be removed without disturbing the relationship between housing 88 and cylinder 34B. With gland 94 removed, shaft 28B can be removed exposing piston 128 so that piston seals 132 can be replaced and the O-ring seals 116 and wiper 120 that are supported by the gland can be replaced, all without disturbing cylinder 34B as mounted between opposed head portions 88 and 90.

Further, a unique feature of gland 94 is that it seals directly against the end of cylindrical tube 34B thus enabling the use of potentially porous clamps. The gland 94 has a small annular cavity at end 112 so that it will not trap significant debris and includes an air bleed port 122 that is located at a convenient place on top of the gland. These unique features are not found in previously known hydraulic cylinder sealing systems for butt-fusion machines.

During a butt-fusion process, time becomes critical after the pipe ends have been heated to the molten state. Heater 38 must be moved rapidly from between the pipes and the pipe ends brought together quickly before they cool. The operator of the equipment performs several tasks during the few seconds he has to get the pipe ends together. His responsibilities include backing the movable pipe away from the heater using the pipe carriage controls, moving the heater longitudinally away from the end of the fixed pipe, rotating the heater out from between the ends of the pipes, examining the melted ends of the pipes to ascertain that the full circumference of both ends are ready to be fused and then reversing the pipe carriage to bring the ends of the pipes together. Control systems used currently in the industry on butt-fusion machines have separate handles for pipe carriage movement, indexer longitudinal positioning and heater rotation. Location of the controls and the orientation of them are important to provide the operator with immediate feedback and visual clues to the direction he must move the levers to get the desired results. With present butt-fusion machines the operator must manipulate three hydraulic valves. Since the operator has only two hands, he must alternate one hand between the indexer longitudinal control and the heater rotation control while using his other hand to control the pipe carriage. This invention provides a way for the operator to have only two handles to control the three functions that is, to control heater longitudinal position, heater rotation position and carriage position.

The control system of the improved butt-fusion machine of this invention is seen in FIG. 1 and is indicated generally by the numerals 40A and 40B. FIGS. 8, 9 and 10 show details of the improved hydraulic control system of this invention. Operation of the butt-fusion machine as illustrated in FIG. 1 requires many separate hydraulic controls. A control is required to pivot fixed clamp movable portions 22B and 28B from opened to closed positions and the reverse. This is accomplished utilizing a fixed clamp valve (not seen) located at 40B. Clamp upper portions 30B and 32B must be moved between open and closed positions. This is accomplished using a movable clamp control valve (not seen) also located at 40B. A valve 142 is termed a pipe carriage valve that supplies hydraulic fluid pressure to cylinders 34A and 34B to laterally translate the movable clamps that thereby move one length of pipe toward or away from a fixed length of pipe. A pipe carriage valve (not seen) is located at 40B. The indexer, which in turn controls the lateral position of heater 38 is positioned by providing hydraulic fluid pressure to index cylinder 72 (as seen in FIG. 4) hydraulic fluid flow to index cylinder 72 being controlled by index control valve 144. Another control that is critical in the butt-fusion of pipe is the elevational placement of the heater, that is, control of fluid pressure to heater lift cylinder 56 (as seen in FIG. 2) to move the heater between-active and storage positions. For this purpose a heater lift valve 146 is employed. A valve 138 controlled by handle 138A controls facer lift cylinder 52 (as seen in FIG. 2). Elevationally controlled rollers 20A and 20B are raised and lowered with valve 142 with handle 142A and with valve 140 with handle 140A respectively.

Of the many controls required to operate a butt-fusion machine the ones that are time critical are those that control the pipe carriage, the lateral position of the index mechanism or indexer and the lift position of the heater. These three valves must be operated more or less simultaneously. Each of the valves as described above are three position valves. In one position hydraulic fluid flows is in one direction into a cylinder. In a second position the hydraulic fluid flow is in an opposite direction into the cylinder. The third is a neutral position in which the valve is closed.

FIGS. 8, 9 and 10 illustrate a joystick apparatus for use in a system whereby with one hand an operator can control two of the three time critical functions and thereby the other hand of the operator can control the third function. FIG. 8 shows a commercially available mechanism for controlling two three-position valves. FIGS. 9 and 10 show a system that uses this available mechanism that includes a handle 42, (the handle is also seen in FIG. 1) that simultaneously controls indexer control valve 144 and heater lift valve 146. The upper end of the handle has a knob 148 for comfortable grasp by the operator. Indexer control valve 144 has a valve body spool 150 that is vertically positionable to move the valve between three positions that is, an intermediate closed, an upper and a lower position. In the upper position the valve directs fluid pressure in one direction to move the indexer mechanism, including heater 38 and facer 36 from right to left and when spool 150 is moved in the opposite direction, the indexer mechanism, including the heater and facer is moved from left to right to thereby position the heater and/or facer as required between ends of adjacent lengths of pipe that are being butt-fused. In like manner, the heater lift valve 146 has a spool 152 that is vertically displaceable so that in the downward position valve 146 supplies fluid under pressure to lift cylinder 56 (see FIG. 2) to lift heater 38 to a position that is spaced above the pipe being fused and when the valve spool 152 is moved to the upward position, the flow of hydraulic fluid to cylinder 56 is reversed moving heater 38 into the downward position so that it is interposed between the end surfaces of lengths of pipe.

Affixed to the top of the valve bodies 144 and 146 is a plate 156 having vertical openings through which spools 150 and 152 extend. Secured to and extending laterally from the vertical valve spool 150 is a rigid positioning member 158 that has a horizontal extending opening 160 therein. Received within opening 160 is a first spherical body 162 that is attached to a pivot member 164 that is pivotally secured to plate 156. When handle 42 is pivoted left to right, spherical body 162 is vertically displaced, thereby vertically displacing positioning member 158 which in turn vertically displaces valve spool 150 that controls the direction of hydraulic fluid flow through indexer control valve 144. To help vertically guide positioning member 158 a post 166 extends upwardly from plate 156 through a vertical opening (not seen) within positioning member 158. Thus, an operator can control the lateral position of the indexer mechanism, as described with reference to FIGS. 2, 3 and 4 to thereby position heater 38 and/or facer 36 between ends of lengths of pipe by moving handle 42 left to right.

Extending from pivot member 164 is a second spherical body 168 that is received in a horizontally extending opening 170 formed in a second vertically displacable positioning member 172. The second vertical positioning member is affixed to valve spool 152 that controls heater lift valve 146. When pivot member 164 is pivoted in a rearward direction, second spherical body 168 causes second positioning member 172 to vertically lift, thereby lowering spool 152 to cause fluid to flow to heater lift cylinder 56 to cause heater 38 to be lifted. When handle 42 is moved in the forward direction, spherical body 168 moves second positioning member 172 upwardly, thereby moving valve spool 152 upwardly to reverse the direction of fluid flow to lift cylinder 56 to thereby move heater 38 in a downward direction.

The mechanism of FIG. 8 as employed in the system of FIGS. 9 and 10 thereby enables an operator to use one hand to control both the lateral and vertical position of heater 38 while the operator can use his other hand to move the pipe carriage valve to move a length of pipe secured in the movable clamps toward and away from the length of pipe secured in the fixed clamps. The mechanism of FIGS. 8, 9 and 10 thereby enables an operator to actuate the time critical controls during a butt-fusion process without having to move his hands from knob 148 and the pipe carriage valve. Handle 42 having knob 148 for comfortable hand grasp at its upper end is sometimes referred to as a "joystick" is not constrained to control only one valve at a time. By angularly positioning pivot member 164 both valves 144 and 146 can be controlled simultaneously.

The specific construction of the control mechanism as illustrated in FIG. 8 and particularly the specific configuration of positioning members 158 and 172 will vary according to the particular type of commercial hydraulic control valves that are employed in practicing the invention.

Figure 11:
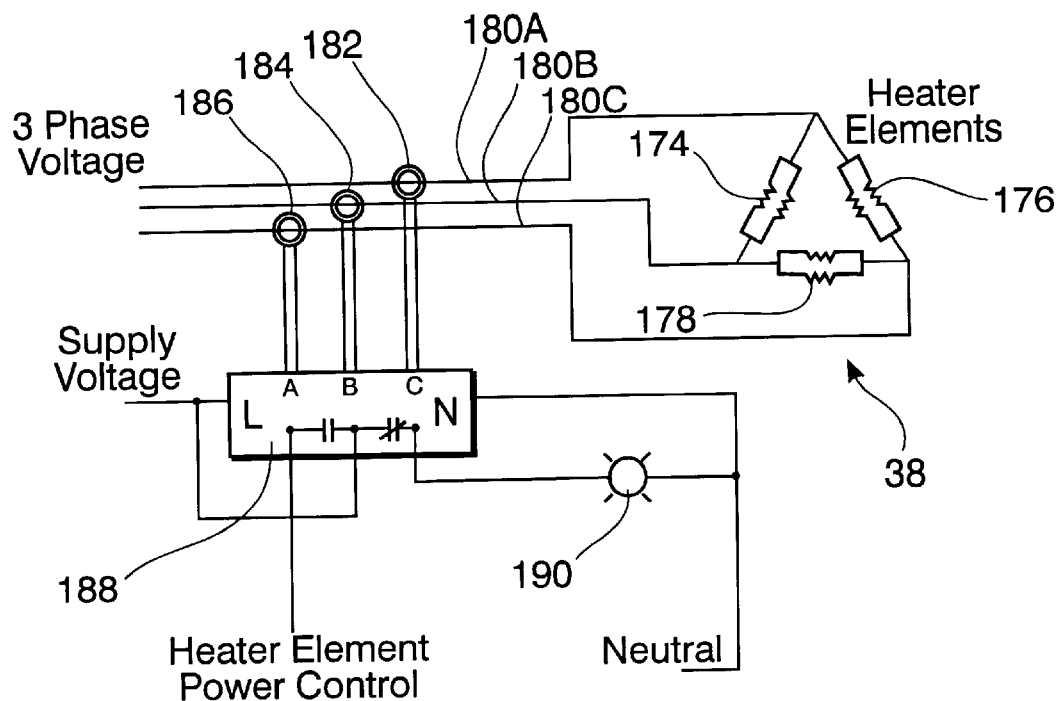
FIG. 11 is a wiring diagram showing the components of a system for sensing heater element failures that is particularly useful for large diameter heaters used in butt-fusion machines. The circuit arrangement of FIG. 11 is applicable when the heater elements are energized with three-phase power wired in a delta configuration.
Figure 12:
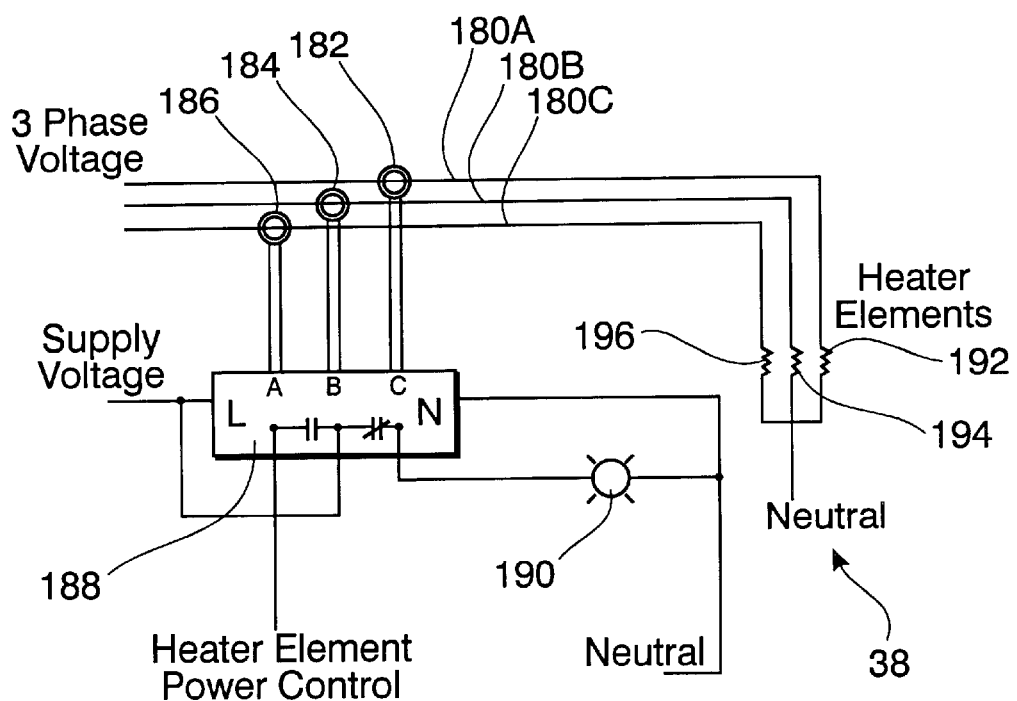
FIG. 12 is a wiring diagram illustrating the use of three-phase electrical energy in a wye configuration for a heater as employed in a butt-fusion of the type illustrated in FIG. 1.

Of critical importance in successful butt-fusion of thermal plastic pipe is uniform heating of the end surfaces to be joined. It is apparent that if a portion of a circumferential end surface is not heated sufficiently to bring that portion to a molten state then when the end portions are forced into an abutted relationship a complete fusion of one length of pipe to another would not occur. When a butt-fusion machine is designed for fusing large diameter pipe, heaters 38 are typically constructed using a plurality of electric heating elements. These elements can be of different types, including embedded rods or flat etch-foil electric heating elements. Stated another way, a well designed heater 38 has a plurality of electrical heating elements located to insure a uniform temperature distribution on both of the opposed planer cylindrical surfaces of the heater. Failure of any heating element will cause the temperature near the element to be reduced compared to the temperature of the heater surface adjacent elements that are properly functioning. If an operator does not detect the failure of a portion of the heating elements forming heater 38 then a bad fusion joint can result. FIGS. 11 and 12 illustrate a system for detecting the failure of one or more heating elements making up a heater as used in butt-fusion of thermoplastic pipe and warning the operator in the event of such failure.

Referring first to FIG. 11, a system is shown in which a heater for use in a butt-fusion machine is served by a three-phase AC voltage source and in which the heater has heater elements arranged in a delta formation. Heater elements are indicated by the numerals 174, 176 and 178. Conductors 180A, 180B and 180C connect the delta wired heater assembly to a three-phase voltage source.

Positioned to measure the current flow in conductor 180A is a current transformer 182. The current flow in conductor 180B is measured by a current transformer 184 and the current flow in conductor 180C is detected by a current transformer 186. Each of the current transformers 180, 184 and 186 provides an AC voltage output that is proportional to the current flow therethrough the associated conductors. If one of the three-phase circuits feeding the heater is connected to a heating element that burns out or is opened, the current flow through one of the conductors 180A, 180B or 180C will be reduced compared to the current flow through the other conductors. The voltage measurements provided by current transformers 182, 184 and 186 are fed to a current unbalance sensor 188. Unbalanced current flow detected by sensor 188 provides a warning signal, such as by the illumination of a heater element failure light 190. An operator observing the illumination of light 190 then will be apprised of the fact that one or more heater elements employed to generate heat within heater 38 has burned out.

Current transformers 182, 184, 186 as well as the current unbalance sensor 188 are commercially available products. A current unbalance sensor that can be employed for element 188 is, for example, Model 2722 as manufactured and sold by Time Mark Industries of Tulsa, Okla.

FIG. 12 shows an alternate arrangement of the system for detecting the failure of a heating element in a heater used in a butt-fusion machine. FIG. 12 is the same as FIG. 11 with the single exception that this figure illustrates the arrangement wherein heater elements 192, 194 and 196 are in a wye configuration. All other elements of the circuit, FIG. 12 are the same as described with reference to FIG. 11.

FIGS. 11 and 12 show the invention as practiced when heater 38 is fed by a three-phase system. The same principles can be used if the heating elements are fed by a single phase system such as the standard 220 volt system as used commercially and residentially in the United States with a grounded transformer center tap.

The improved butt-fusion machine that has been described herein is particularly relevant when the machine is designed for large diameter pipes. When butt-fusing smaller diameter pipes most, if not all, of the physical movements of the machine components can be done manually and therefore it is possible to butt-fuse pipes without the use of any hydraulic control systems. Such smaller diameter machines would therefore not need the improvements that are set forth herein that are particularly for butt-fusing larger pipes such as pipes ranging in diameter from 12 inches and up. An improved butt-fusion machines can be manufactured which does not employ all of the features of this invention. As an example, a butt-fusion machine having the improved indexing mechanism of FIGS. 2, 3 and 4 can be accomplished without employing the improved cylinder/gland design of FIGS. 5, 6 and 7 or without the improved hydraulic control system of FIGS. 8, 9 and 10 or without the heating element failure indicator of FIGS. 11 and 12. However, when all of the features are employed together a substantially improved butt-fusion, especially for larger diameter thermal plastic pipe, is achieved.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An indexer system for use with a plastic pipe butt-fusion machine of the type of having a machine super-structure, parallel horizontal support shafts affixed to said super-structure, a first clamp system on said support shafts for removably grasping an end portion of a first length of plastic pipe, a second clamp system on said support shafts for removably grasping an end portion of a second length of plastic pipe and an actuator system for moving said clamp systems, and thereby plastic pipes grasped therein, towards and away from each other, the indexer system comprising:
    an indexer shaft mounted on said super-structure spaced from and parallel to said support shafts;
    an indexer carriage slidable on said indexer shaft;
    a facer and a heater separately and pivotally secured to said indexer carriage;
    an index cylinder for laterally positioning said indexer carriage to thereby selectably locate said facer and heater between lengths of plastic pipe as secured by said clamp systems; and
    a structural beam having opposed vertical side surfaces, the beam being secured to said super-structure and parallel to and spaced from said indexer shaft, said indexer carriage being slidably retained with respect to the structural beam by inner and outer rollers whereby said indexer carriage is retained in predetermined orientation relative to said horizontal support shafts.

2. An indexer system for a plastic pipe butt-fusion machine according to claim 1 including spaced apart first and second upright structural brackets affixed to said machine super-structure, said indexer shaft having a first end secured to a lower portion of said first structural bracket and a second end secured to a lower portion of said second structural bracket, a first end of said structural beam affixed to an upper portion of said first structural bracket and a second end of said structural beam affixed to an upper portion of said second structural bracket.

3. An indexer system for a plastic pipe butt-fusion machine according to claim 1 including:
    a linear bearing system mounted on said indexer shaft and supporting said indexer carriage.

4. An indexer system for a plastic pipe butt-fusion machine according to claim 1 including:
    a hydraulic cylinder/piston system connected between said machine super-structure and said indexer carriage for controllably translating said carriage and thereby said facer and heater.

5. An indexer system for a plastic pipe butt-fusion machine according to claim 1 wherein substantially all the weight of said indexer carriage, including said facer and heater supported thereto, is carried by said indexer shaft and wherein said function of said structural beam is essentially limited to controlling the vertical orientation of said indexer carriage.

* * * * *